(12) United States Patent
Untiedt et al.

(10) Patent No.: US 7,216,096 B1
(45) Date of Patent: May 8, 2007

(54) INTEGRATED INVENTORY MANAGEMENT SYSTEM

(75) Inventors: James H Untiedt, Shelby Township, MI (US); Nagendra Prasad, Troy, MI (US); Todd C DeLong, Fenton, MI (US); William C Steel, Lakeshore (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 627 days.

(21) Appl. No.: 09/718,955

(22) Filed: Nov. 22, 2000

(51) Int. Cl.
  *G06Q 10/00* (2006.01)
(52) U.S. Cl. ....................................................... 705/28
(58) Field of Classification Search .................. 705/28
  See application file for complete search history.

(56) References Cited

U.S. PATENT DOCUMENTS

| | | | | |
|---|---|---|---|---|
| 4,972,318 | A | * | 11/1990 | Brown et al. .................. 705/28 |
| 5,694,551 | A | * | 12/1997 | Doyle et al. ................... 705/26 |
| 5,712,989 | A | * | 1/1998 | Johnson et al. ............... 705/28 |
| 5,765,143 | A | * | 6/1998 | Sheldon et al. ............... 705/28 |
| 5,819,092 | A | * | 10/1998 | Ferguson et al. ............. 705/39 |
| 5,884,300 | A | * | 3/1999 | Brockman .................... 705/28 |
| 5,893,076 | A | * | 4/1999 | Hafner et al. ................. 705/28 |
| 5,970,472 | A | * | 10/1999 | Allsop et al. ................. 705/27 |
| 6,055,516 | A | * | 4/2000 | Johnson et al. ............... 705/27 |
| 6,076,093 | A | * | 6/2000 | Pickering ................. 707/104.1 |
| 6,282,517 | B1 | * | 8/2001 | Wolfe et al. .................. 705/26 |
| 6,397,226 | B1 | * | 5/2002 | Sage ............................ 705/28 |
| 6,505,172 | B1 | * | 1/2003 | Johnson et al. ............... 705/27 |
| 6,546,374 | B1 | * | 4/2003 | Esposito et al. .............. 705/27 |

(Continued)

FOREIGN PATENT DOCUMENTS

WO    WO 9011572 A1  *  10/1990

OTHER PUBLICATIONS

Clay, Gregory, "Evaluating Forecasting Algorithms and Stocking Level Strategies Using Discrete-Event Simulation", Winter 1997, Proceeding of the 1997 Winter Simulation Conference, obtained through www.informs-cs.org/wsc97papers/0817.PDF.*

(Continued)

*Primary Examiner*—Yogesh C. Garg
*Assistant Examiner*—Ernesto Garcia
(74) *Attorney, Agent, or Firm*—Ralph E. Smith

(57) ABSTRACT

A vehicle part inventory management system is provided for filling at least part of the vehicle part orders by one vehicle dealer from the inventory of another vehicle dealer. The inventory management system includes an ordered parts data structure for storing ordered parts information; an inventory data structure for storing vehicle part inventory information for a plurality of vehicle dealers; and a dealer assessment module connected to the ordered parts data structure and the inventory data structure, such that the dealer assessment module receives at least one request to fill a vehicle part order and is able to determine a list of potential supplying dealers that have the ordered vehicle part. The inventory management system further includes a dealer interface module that receives the list of potential supplying dealers and is able communicate a request to supply the ordered vehicle part to at least one of the potential supplying dealers. The dealer interface module is also able to update the ordered parts data structure in real-time when the request for the ordered vehicle part is accepted by one of the potential supplying dealers.

14 Claims, 3 Drawing Sheets

U.S. PATENT DOCUMENTS 6,606,744 B1 * 8/2003 Mikurak ............... 705/26
2001/0034656 A1 * 10/2001 Lucas et al. ............ 705/26
2001/0042023 A1 * 11/2001 Anderson et al.

OTHER PUBLICATIONS

James Aaron Cooke, "Software with a Vroommmmmmmmmm", Aug. 1998, LogisticsTech, p. 103.*

* cited by examiner

INTEGRATED INVENTORY MANAGEMENT SYSTEM

BACKGROUND OF THE INVENTION

1. Field of the Invention

The present invention relates generally to an integrated inventory management system and, more particularly, to a computer-implemented vehicle part inventory management system that fills at least some vehicle part orders by a vehicle dealer from the inventory of another vehicle dealer.

2. Discussion

Research performed by vehicle manufactures has shown that vehicle dealers have generally exercised inadequate or inconsistent inventory control practices. These practices have frequently resulted in poor vehicle parts availability, excessive field obsolescence and ineffective inventory investment. In addition, the inconsistency with which the vehicle dealers conducted their parts business also fed back though the supply chain and adversely affected the efficiency and responsiveness of the vehicle parts suppliers.

In order to reduce and/or eliminate these impacts, vehicle manufactures determined that there was a need to gain system-wide vehicle parts inventory "visibility" for the vehicle manufactures and their dealers. Thus, an integrated vehicle part inventory management system was developed to meet this need. The integrated inventory management system includes a parts locator feature, an automated dealer-to-dealer referral feature, a suggested stock order feature, a suggested material return feature, and some improved reporting features. In this way, the vehicle manufactures expected to reduce vehicle dealer inventories with increased parts mix, improve part fill rates, reduce field obsolescence and improve overall performance throughout the supply chain.

As is well known, a conventional parts ordering system may be used to track and fill vehicle part orders received from vehicle dealers. When the parts supplier is unable to fill a part order on a timely basis, the part order receives a backorder status and the vehicle dealer is left to wait until the order is filled by the parts supplier. In order to reduce the number of backorders, dealer-to-dealer referral programs have been incorporated into some inventory management systems.

In at least one known system, backorder information is extracted on a nightly basis from the parts ordering system. Using the backorder information, the system creates a list of vehicle dealers who have the ordered parts, and then automatically queries each of these vehicle dealers on behalf of the requesting dealer. In order to update the parts ordering system, the system also generates an output file that indicates which orders have been filled through the referral process. On a nightly basis, the output file is then used to update the status of the ordered parts in the parts ordering system.

Unfortunately, this process allows for double shipment of a backordered part. During the course of a given day, it is conceivable that a backorder may be filled and shipped to a requesting dealer prior to the nightly update of the parts ordering system. In this way, a backordered part may inadvertently be shipped by the parts supplier as well as shipped by a supplying dealer.

Therefore, it is desirable to provide an integrated inventory management system that fills vehicle part orders from the inventory of another vehicle dealer as well as updates in real-time the order status for the vehicle part in the parts ordering system. It is also desirable that the system check the order status prior to communicating a request to supply the vehicle part to a vehicle dealer.

SUMMARY OF THE INVENTION

In accordance with the teachings of the present invention, a vehicle part inventory management system is provided for filling at least part of a vehicle part order by one vehicle dealer from the inventory of another vehicle dealer. The inventory management system includes an ordered parts data structure for storing ordered parts information; an inventory data structure for storing vehicle part inventory information for a plurality of vehicle dealers; and a dealer assessment module connected to the ordered parts data structure and the inventory data structure, such that the dealer assessment module receives at least one request to fill a vehicle part order and is able to determine a list of potential supplying dealers that have the ordered vehicle part. The inventory management system further includes a dealer interface module that receives the list of potential supplying dealers and is able communicate a request to supply the ordered vehicle part to at least one of the potential supplying dealers. The dealer interface module is also able to update the ordered parts data structure in real-time when the request for the ordered vehicle part is accepted by one of the potential supplying dealers.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
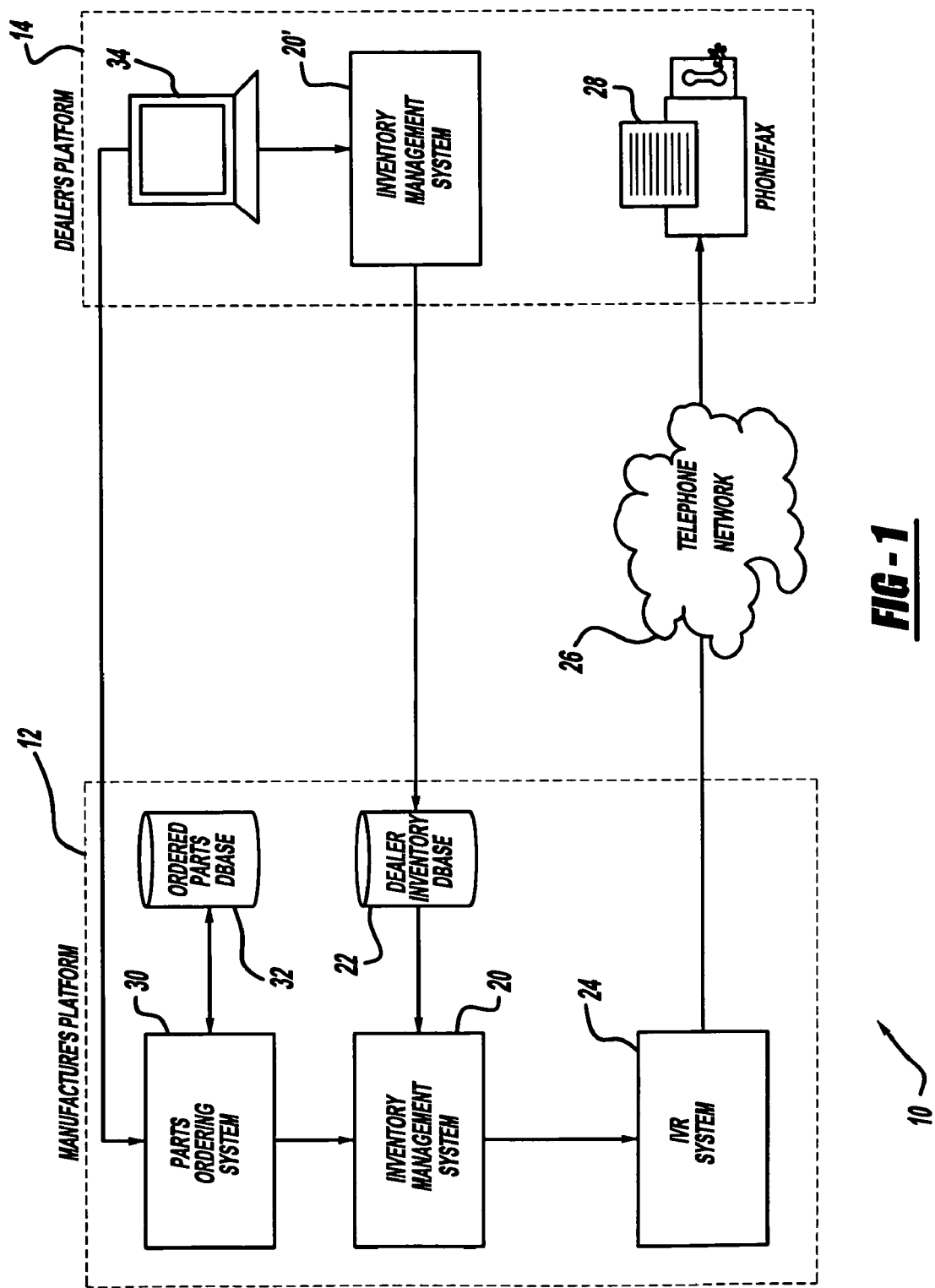
FIG. 1 is a diagram depicting the distributed computing platforms for an integrated inventory management system embodying aspects of the present invention.

An integrated inventory management system 10 embodying aspects of the present invention is depicted in FIG. 1. The integrated inventory management system 10 is distributed between a centralized computing platform 12 and one or more local computing platforms 14 residing at vehicle dealers. For illustration purposes, the centralized computing platform is owned and operated by the vehicle manufacturer. Although the parts supplier for each dealer is typically the vehicle manufacturer, it is readily understood that in other industries the parts supplier and its associated parts ordering system may be independent from the original equipment vehicle manufacturer.

The integrated inventory management system 10 generally includes a centralized inventory management system 20 and an associated dealer inventory data structure or database 22. The dealer inventory database 22 is used to store vehicle part information for a plurality of vehicle dealers and is periodically updated (e.g., on a daily basis) with part information from each of the vehicle dealers. In addition, the inventory management system 20 interfaces with an interactive voice response (IVR) system 24. In this way, the inventory management system 20 is able to communicate part queries over a public switched telephone network 26 to a telephony device 28 residing at the vehicle dealer. It is envisioned that the IVR system 24 may also communicate with a facsimile machine, a personal computer or other types of communication devices that may reside at the vehicle dealer.

A parts ordering system 30 and an associated ordered parts database 32 also reside on the manufacture's computing platform 12. As is well known, the parts ordering system 30 supports various operations ranging from accepting part orders to filling and shipping part orders to a requesting dealer. Thus, the ordered parts database 32 is used to store ordered parts information as requested by a vehicle dealer. Additionally, at least one computing terminal 34 residing at the vehicle dealer is adapted to access the parts ordering system 30. As will be more fully explained below, the parts ordering system 30 is integrated with the inventory management system 10.

At least a portion of the inventory management system 20' resides on a computing device at the vehicle dealer. Each dealer uses this portion of the inventory management system 20' to input and manage their vehicle part inventory. A dealer's part inventory information is periodically uploaded (e.g., on a nightly basis) to the centralized dealer inventory database 22 residing on the manufacture's computing platform 12. In a preferred embodiment, the manufacturer's computing platform 12 and the computing platform for each dealer 14 are interconnected by a satellite communication link. However, as will be apparent to one skilled in the art, the computing platforms 12 and 14 may also be able to communicate using common communication protocols (e.g., TCP/IP) over other types of network channels.

Figure 2:
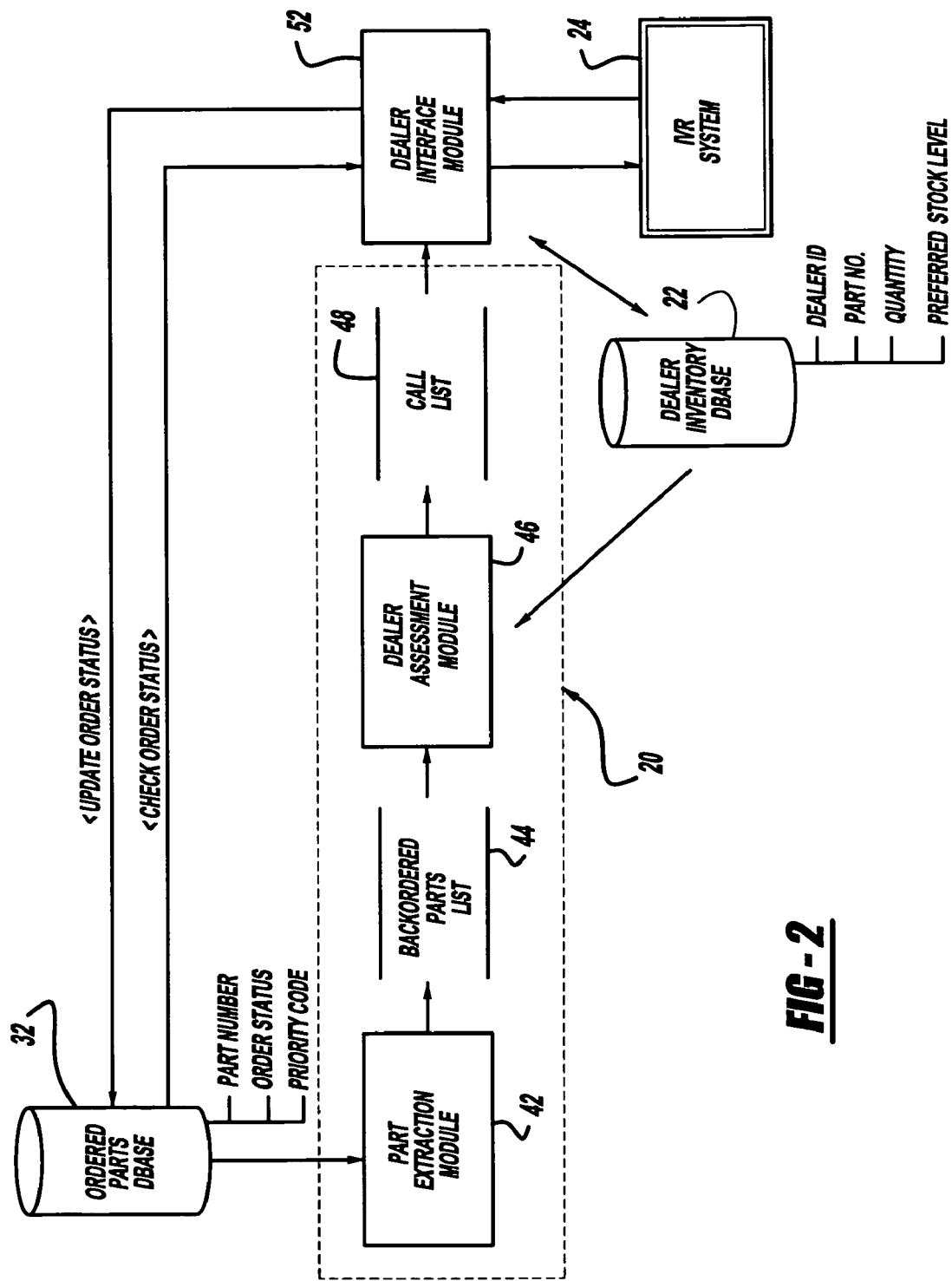
FIG. 2 is a block diagram showing the components of the inventory part management system of the present invention.

Referring to FIG. 2, a more detailed description is provided for the centralized inventory management system 20. First, a part extraction module 42 is used to extract the relevant part information for each unfilled part order in the ordered parts database 32. However, the part extraction module 42 may not process every unfilled part order. For instance, hazardous type parts or parts that are deemed excluded from the dealer-to-dealer referral program may not be processed by the parts extraction module 42. Likewise, the parts extraction module 42 may not process parts that have been received into the manufacture's supply chain but not yet delivered to the requesting dealer. For example, a backordered part may be sitting on a truck at or in-transit to the manufacture's distribution warehouse. In either case, the backordered part is not a candidate for the dealer-to-dealer referral program. One skilled in the art will readily recognize that other criteria may be used to exclude certain unfilled part orders from the dealer-to-dealer referral program. The output from the part extraction module 42 is a list of backordered parts 44 eligible for the dealer-to-dealer referral program as shown in FIG. 2.

Prior to searching for potential supplying dealers, the list of backordered parts 44 may be sequenced. It is envisioned that each unfilled part order may provide a backorder priority code indicative of the urgency of the request. If multiple backorders exist for the same part, then the more critical requests will be addressed first. In other words, backorders may be processed from highest priority to lowest priority (e.g., based on the numeric value of the code). Likewise, each unfilled part order may provide a backorder date and time. If multiple backorders for the same part have the same priority code, then the backorders may be processed from oldest to newest based on the backorder date and time.

A dealer assessment module 46 is then used to compile a call list 48 of potential supplying dealers for each backordered part. Potential supplying dealers are identified by searching through the dealer inventory database 22. Thus, the search logic is designed to reduce unnecessary split shipments, refer older parts from dealer inventory first, and reduce a dealer's excess stock. In a preferred embodiment, the dealer assessment module 46 is implemented as a subroutine that is called by the parts extraction module 42 for each backordered part.

Figure 3:
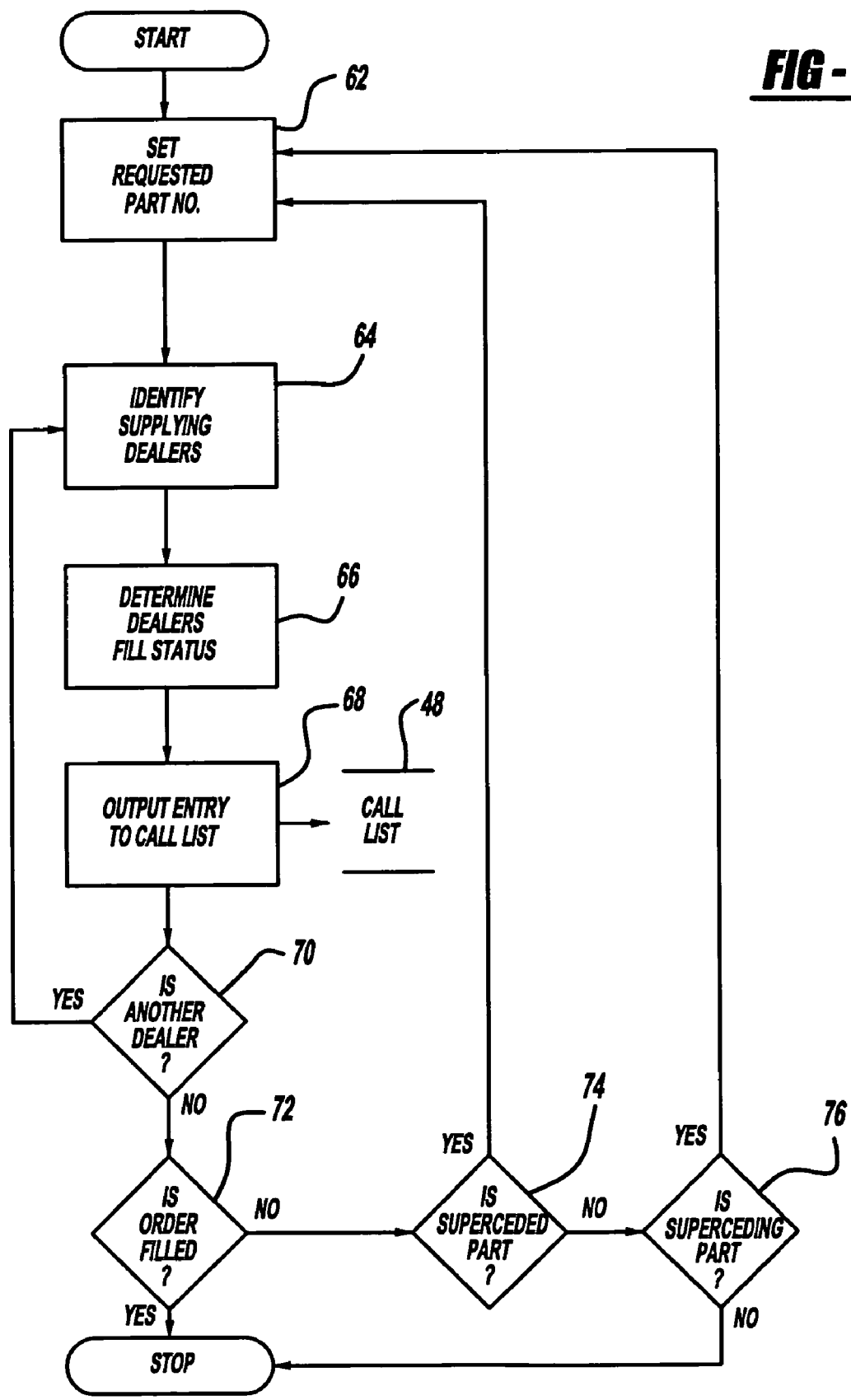
FIG. 3 is a flowchart illustrating a preferred search logic employed by the inventory part management system of the present invention.

FIG. 3 illustrates the preferred search logic employed by the dealer assessment module 46. For each backordered part, the requested part value is set to the original part number at 62. The requested part number is then used to identify at 64 a potential supplying dealer. For each potential supplying dealer, there are four possible fill scenarios: (1) complete fill by excess, (2) complete fill by quantity-on-hand, (3) partial fill by excess, or (4) partial fill by quantity-on-hand. As further described below, the appropriate fill status is determined for each potential supplying dealer at 66.

If the supplying dealer's excess is greater than or equal to the required quantity, then the excess parts are used to completely fill the backorder. If the supplying dealer's excess is less than the required quantity, but the quantity-on-hand is greater than or equal to the required quantity, then the quantity-on-hand parts are used to completely fill the backorder. If the supplying dealer's excess is less than the required quantity but greater than zero and the quantity-on-hand is less than the required quantity, then the excess parts are used to partially fill the backorder. If the supplying dealer's excess is equal to zero and the quantity-on-hand is less than the required quantity, then the quantity-on-hand parts are used to partially fill the backorder. In a preferred embodiment, the dealer's excess for any given part is defined as the quantity-on-hand minus a predetermined best stocking level for the part.

For each potential supplying dealer, the pertinent information is then output at 68 to the call list 48. Each entry in the call list will identify the requested part number, a potential supplying dealer, the fill status for that dealer, the dealer's phone number, the dealer's fax number as well as other information. If at 70 it is determined that there is another dealer who has the requested part, the above-described process is repeated for that potential supplying dealer; otherwise, the search logic evaluates whether the backorder can be filled from the compiled list of potential supplying dealers.

At 72 it is determined whether the backorder was filled. A backorder is completely filled if at least one potential supplying dealer has a complete fill status or the backorder can be filled by several partial fills from two or more potential supplying dealers. However, if the backorder can not be completely filled after searching through all of the potential supplying dealers, then the search logic will continue to search for the requested part by using a corresponding superceded part number as shown at 74. If a corresponding superseded part number exists for the requested part then the requested part number is set to the superceded part number at 62 and the above-described process is repeated until the backorder is completely filled. If there is no corresponding superceded part number or the backorder can not be filled after searching though all of the potential supplying dealers using the superseded part number, then the search logic will continue to search for the originally requested part by checking for a superceding part number as shown at 76. If a corresponding superceding part number exists for the requested part, then the requested part number is set to the superceding part number at 62 and the above-described process is repeated until the backorder is completely filled.

Upon completion of the above-described search logic, the call list of potential supplying dealers is sorted. The call list is generally sorted by fill status, time zone information and inventory information for the potential supplying dealers. The call list is first sorted by fill status of the potential supplying dealer according to the following order: complete fill by excess, complete fill by quantity-on-hand, partial fill by excess and partial fill by quantity-on-hand.

Next, the call list is sorted by time zone information for the potential supplying dealers as it relates to the time zone of the requesting dealer. In particular, the potential supplying dealers are sorted from west to east within a predefined geographic region (e.g., the U.S.) starting with the time zone of the requesting dealer. Upon reaching time zone farthest east within the geographic region (e.g., EST), the sort order continues with the western most time zone in the geographic region (e.g., PST). For example, for a requesting dealer located in the mountain standard time zone, the call list is further sorted according to the following order: potential supplying dealers in the mountain time zone, central time zone, eastern time zone and pacific time zone. In this way, all potential supplying dealers within the same time zone appear as equally close to the requesting dealer when formulating the call list. However, it is envisioned that potential supplying dealer may be sorted using other criteria. Lastly, potential supplying dealers having the same fill status within the same time zone are sorted by the dealer's excess and quantity-on-hand values.

Returning to FIG. 2, the sorted call list 48 serves as an input to the dealer interface module 52. The dealer interface module 52 in turn serves as the interface between the inventory management system 20 and an external dealer communication system. In a preferred embodiment, the external dealer communication system is interactive voice response (IVR) system 24 which is operative to place telephone calls to the potential supplying dealers. However, it is envisioned that the dealer communication system may also communicate with the potential supplying dealers via email messages, facsimile messages or by placing calls through a call center.

In operation, the dealer interface module 52 logs call requests with the IVR system 54 based on the list of potential supplying dealers compiled in the call list 48. In a preferred embodiment, the dealer interface module 52 only logs call requests when the potential supplying dealer is open, where all dealers are presumed to have the same hours of operation (e.g., 8:00 am to 5:00 pm). It should be noted that only one call will be requested at any given time for backorders having the same requested part. In addition, subsequent calls for the same part will not be placed until the dealer interface module 52 receives a response for the previous call request for that part.

Upon receiving a call request, the IVR system places a call asking if the dealer is willing to provide the requested part to the requesting dealer. The supplying dealer's response is then passed back to the dealer interface module 52. If the supplying dealer agrees to supply the part to the requesting dealer, the dealer interface module 52 updates in real-time the status of the backorder in the ordered parts database 32. By immediately updating the ordered parts database, the integrated inventory management system 10 of the present invention eliminates any double shipment of the backordered part to the requesting dealer.

In order to process multiple requests for the same part, the dealer interface module 52 must also interface with the dealer inventory database 22. Once a supplying dealer agrees to supply a part, that dealer's excess and quantity-on-hand values are updated in the dealer inventory database 22. For example, if a backorder is completely filled from excess, then the required part quantity is subtracted from the supplying dealer's excess and quantity-on-hand values. Prior to processing subsequent requests for the same part, the dealer interface module 52 is further able to access these updated dealer inventory values in the dealer inventory database 22. In this way, a call request will not be placed to a potential supplying dealer whose inventory of the requested part has previously been committed to another requesting dealer.

On the other hand, if the supplying dealer declines to supply the part, the dealer interface module 52 queues another call request for the next potential supplying dealer in the call list. Prior to making the call request, the dealer interface module 52 may be operative to check the order status (in real-time) for the requested part. In other words, the dealer interface module 52 may make a query to the ordered parts database 32 to ensure that the part is still on backorder. Again, this real-time interface with the ordered parts database 32 eliminates any double shipment of backordered parts. In the event of a non-responsive call (i.e., busy signal or no answer) to a dealer, the dealer interface module 52 may also require the same call request after a predefined time delay (e.g., 5 minutes) and continue to queue the call request to a predetermined number of retries. It is further envisioned that once a potential supplying dealer declines to supply a part, the system is operative to avoid soliciting the same dealer for the same part for a user-specified period of time (e.g., 30 days).

While the above description constitutes the preferred embodiment of the invention, it will be appreciated that the invention is susceptible to modification, variation, and change without departing from the proper scope or fair meaning of the accompanying claims.

We claim:

1. A computer-implemented vehicle part inventory management system that fills vehicle part orders from the inventory of a vehicle dealer, comprising:

at least one computer system having at least one memory;

an ordered parts database stored in the memory for storing ordered parts information;

an inventory database stored in the memory for storing vehicle part inventory information for a plurality of vehicle dealers;

the computer system programmed with a part extraction module that is operative to determine from the information in the ordered parts database at least one backordered vehicle part;

the computer system programmed with a dealer assessment module operative to compile a list of vehicle dealers having the backordered vehicle part based on the information stored in the inventory database; and the computer system programmed with a dealer interface module receptive of the list of vehicle dealers having the backordered vehicle part and operative to communicate a request to supply the backordered vehicle part to at least one of the vehicle dealers having the backordered vehicle part;

said dealer interface module further operative to update a status of the backordered part in the ordered parts database in real-time when the request to supply the backordered vehicle part is accepted by one of the vehicle dealers.

2. The vehicle part inventory management system of claim 1 wherein the part extraction module is operative to compile a list of backordered vehicle parts to serve as input to the dealer assessment module.

3. The vehicle part inventory management system of claim 2 wherein the part extraction module is operative to sequence the list of backordered vehicle parts based on a priority code associated with each backordered vehicle part.

4. The vehicle part inventory management system of claim 1 wherein the dealer assessment module is further operative to determine time zone information for a requesting vehicle dealer and each of the vehicle dealers having the backordered vehicle part, and to sequence the list of vehicle dealers having the backordered vehicle part using the time zone information of the vehicle dealers having the backordered vehicle part as that time zone information relates to the time zone information for the requesting vehicle dealer.

5. The vehicle part inventory management system of claim 1 further comprises an interactive voice response (IVR) system receptive of the request for the backordered vehicle part from the dealer interface module and operative to place a telephone call to at least one of the vehicle dealers.

6. The vehicle part inventory management system of claim 1 wherein the dealer interface modules upon one of the vehicle dealers accepting the request to supply the backordered vehicle part, is operative to update in real time the vehicle part inventory information in the inventory database for that vehicle dealer.

7. The vehicle part inventory management system of claim 1 wherein the dealer interface module is operative to verify an order status for the backordered vehicle part as stored in the ordered parts database prior to communicating the request to supply to the vehicle dealer.

8. A computer-implemented vehicle part inventory management system that fills vehicle part orders from the inventory of a vehicle dealer, comprising:
at least one computing platform on which an ordered parts database resides in which ordered parts information is stored and on which an inventory database resides in vehicle part inventory information for a plurality of vehicle dealers is stored;
the computing platform having a part extraction module that determines from the information in the ordered parts database at least one backordered vehicle part;
the computing platform having a dealer assessment module that compiles a list of vehicle dealers having the backordered vehicle part based on the information stored in the inventory database; and
the computing platform having a dealer interface module receptive of the list of vehicle dealers having the backordered vehicle part that communicates a request to supply the backordered vehicle part to at least one of the vehicle dealers having the backordered vehicle part, said dealer interface module further updating a status of the backordered part in the ordered parts database in real-time when the request to supply the backordered vehicle part is accepted by one of the vehicle dealers.

9. The vehicle part inventory management system of claim 8 wherein the part extraction module compiles a list of backordered vehicle parts to serve as input to the dealer assessment module.

10. The vehicle part inventory management system of claim 9 wherein the part extraction module sequences the list of backordered vehicle parts based on a priority code associated with each backordered vehicle part.

11. The vehicle part inventory management system of claim 8 wherein the dealer assessment module further determines time zone information for a requesting vehicle dealer and each of the vehicle dealers having the backordered vehicle part, and to sequence the list of vehicle dealers having the backordered vehicle part using the time zone information of the vehicle dealers having the backordered vehicle part as that time zone information relates to the time zone information for the requesting vehicle dealer.

12. The vehicle part inventory management system of claim 8 further comprises an interactive voice response (IVR) system receptive of the request for the backordered vehicle part from the dealer interface module and operative to place a telephone call to at least one of the vehicle dealers.

13. The vehicle part inventory management system of claim 8 wherein the dealer interface module, upon one of the vehicle dealers accepting the request to supply the backordered vehicle part, is operative to update in real time the vehicle part inventory information in the inventory database for that vehicle dealer.

14. The vehicle part inventory management system of claim 8 wherein the dealer interface module is operative to verify an order status for the backordered vehicle part as stored in the ordered parts database prior to communicating the request to supply to the vehicle dealer.

* * * * *